United States Patent [19]
Gilb

[11] Patent Number: 5,236,273
[45] Date of Patent: Aug. 17, 1993

[54] RAFTER-TO-CORNER PLATE CONNECTION

[75] Inventor: Tyrell T. Gilb, Berkeley, Calif.

[73] Assignee: Simpson Strong-Tie Company, Inc., San Leandro, Calif.

[21] Appl. No.: 808,573

[22] Filed: Dec. 17, 1991

[51] Int. Cl.⁵ ............................................. F16B 7/08
[52] U.S. Cl. .............................. 403/232.1; 403/219;
403/170; 403/402; 52/702; 52/94
[58] Field of Search ................. 52/702, 82, 94, 92;
403/232.1, 219, 217, 170, 172, 403, 402

[56] References Cited

U.S. PATENT DOCUMENTS

| | | | |
|---|---|---|---|
| 1,657,243 | 1/1928 | Daniels . | |
| 3,091,822 | 6/1963 | Fiekers et al. . | |
| 3,184,800 | 5/1965 | Nelson . | |
| 3,423,898 | 1/1969 | Tracy et al. | 52/713 |
| 3,481,635 | 12/1969 | Tracy . | |
| 3,596,941 | 8/1971 | Tracy . | |
| 3,925,954 | 12/1975 | Snow et al. | 52/752 |
| 3,972,169 | 8/1976 | Sheppard, Jr. | 52/702 |
| 4,229,915 | 10/1980 | Snow et al. | 52/92 |
| 4,410,294 | 10/1983 | Gilb et al. | 403/27 |
| 4,423,977 | 1/1984 | Gilb | 403/232.1 |
| 4,592,671 | 6/1986 | Daum | 403/172 X |
| 4,669,235 | 6/1987 | Reinen | 52/92 X |
| 4,713,923 | 12/1987 | Sielaff et al. | 52/702 X |
| 4,932,173 | 6/1990 | Commins | 52/702 X |

OTHER PUBLICATIONS

Simpson Strong-Tie Company, Inc., Catalog copyright 1991 "Connectors for Wood Construction, Product & Instruction Manual" Catalog C91H-1, Jan. 1991.

Primary Examiner—Randolph A. Reese
Assistant Examiner—Harry C. Kim
Attorney, Agent, or Firm—James R. Cypher

[57] ABSTRACT

A wood rafter to wood corner plate connection in either a gazebo or a building roof having a hip roof. A single element sheet metal connector is provided having a base member connected to the corner plate, wing members connected to and tying the corner plates together, and a seat member bendably connected to the base for attaching a rafter at varying angles from 0° to 90°.

3 Claims, 5 Drawing Sheets

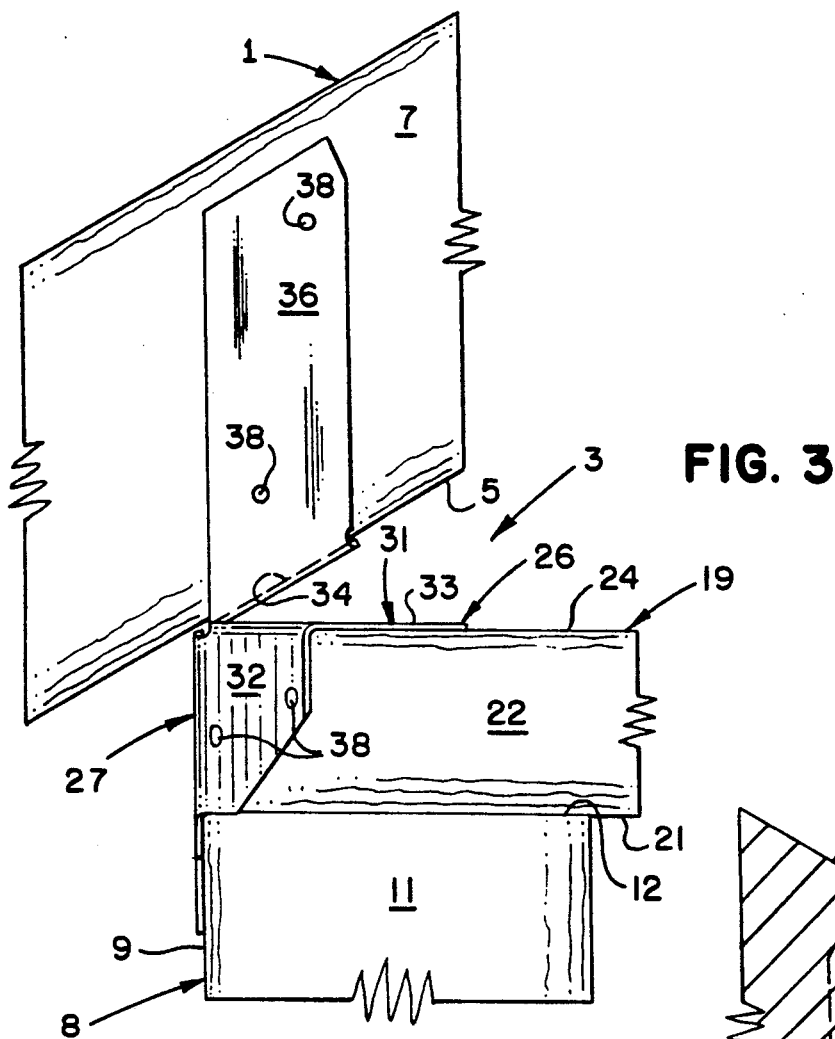
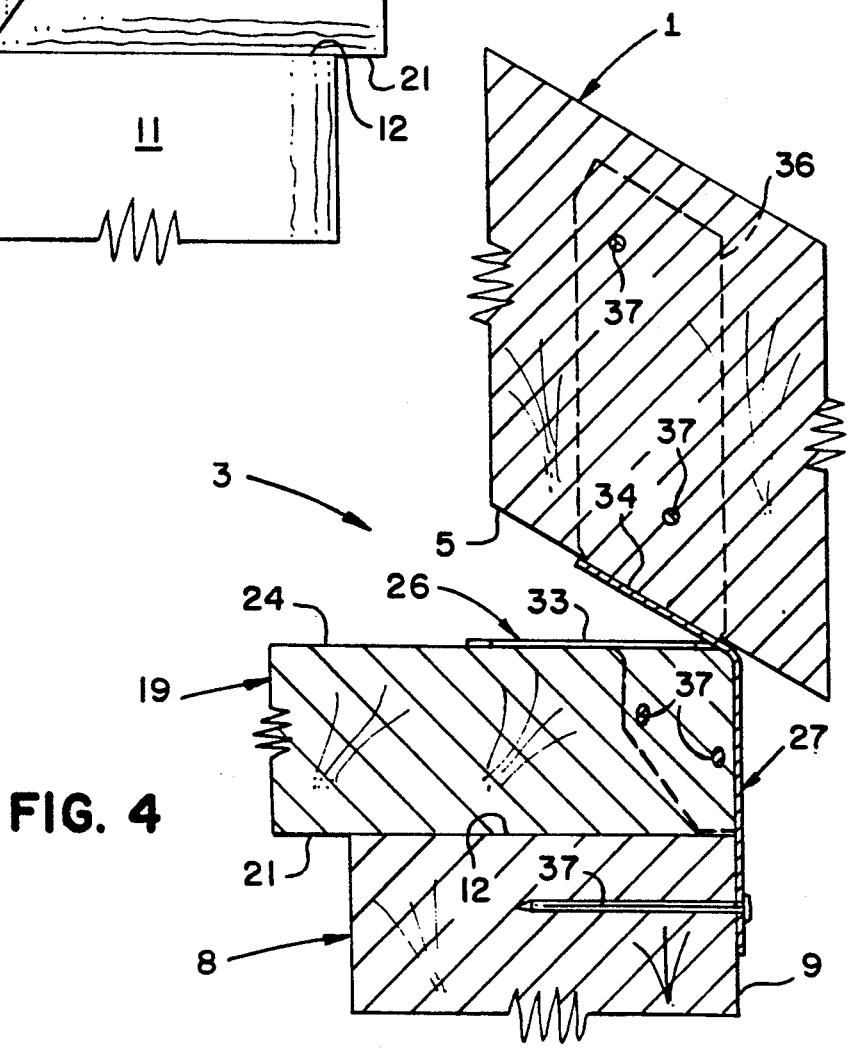

RAFTER-TO-CORNER PLATE CONNECTION

BACKGROUND

This invention relates to a rafter-to-corner plate connection; most commonly occurring in wood frame buildings having a hip type roof or in wood frame gazebos.

Sheet metal connectors for joining common rafters to wood top plate members have been in use for some time. There is, however, no connector commercially available for joining hip rafters to corner plates or gazebo rafters to top plates.

The rafter-to-corner plate connectors taught by a few patents are impractical because they are either too costly to manufacture or are incapable of handling the many different rafter slope angles.

Prior art rafter-to-corner plate connections such as Snow, U.S. Pat. No. 3,925,954 require that the hip rafter be deeply miter cut or "bird-mouth" cut as in Snow U.S. Pat. No. 4,229,915 in order to lower the hip rafter so that it will lie in the same plane as the adjacent common rafters. Hip rafters due to the geometry of a roof carry the greatest load, yet such deep cutting of the hip rafter weakens the ability of the hip rafter to carry roof loads.

SUMMARY OF THE INVENTION

The identical connector of the present invention is capable of joining gazebo rafters to top plates as well as hip rafters in hip type roof construction to top plates.

A feature of the present connector is that it is capable of receiving rafters of infinite slope angles and even substantially flat roofs without factory or field modification other than making a simple bend.

Another feature is the ability of the instant connector to provide tie strength between the ends of the abutting plate members as well as provide holdown resistance for the rafter.

A further feature is the ability to provide a connector for either 2 inch or 4 inch width rafters with little modification.

A still further feature is that by using the instant connector the use of double plates has been eliminated in some installations such as factory-fabricated buildings.

An even further feature is the fact that the instant rafter-to-plate connection does not require miter or "bird-mouth" cutting of the hip rafter in order to cause the hip rafter to lie in the same plane as the adjacent common rafters.

BRIEF DESCRIPTION OF THE DRAWINGS

FIG. 3 is a side elevation view of the connection taken along line 3—3 in FIG. 2.

FIG. 4 is a cross section view taken generally along line 4—4 in FIG. 2.

DESCRIPTION OF THE INVENTION

Figure 1:
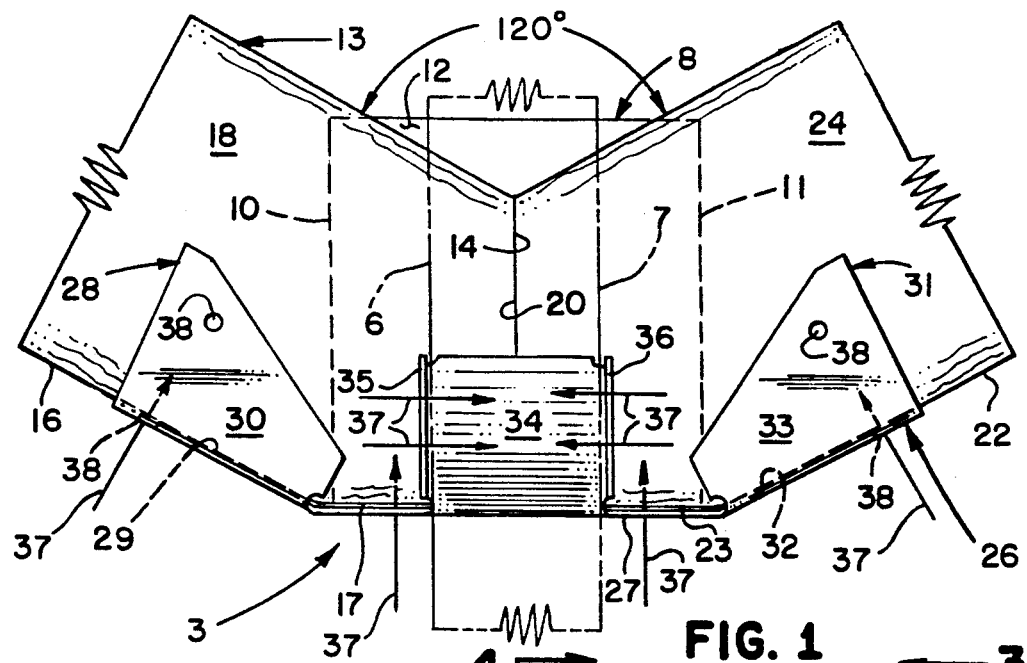
FIG. 1 is a top plan view of the connection of the present invention used in a gazebo structure taken along line 1—1 in FIG. 5.
Figure 2:
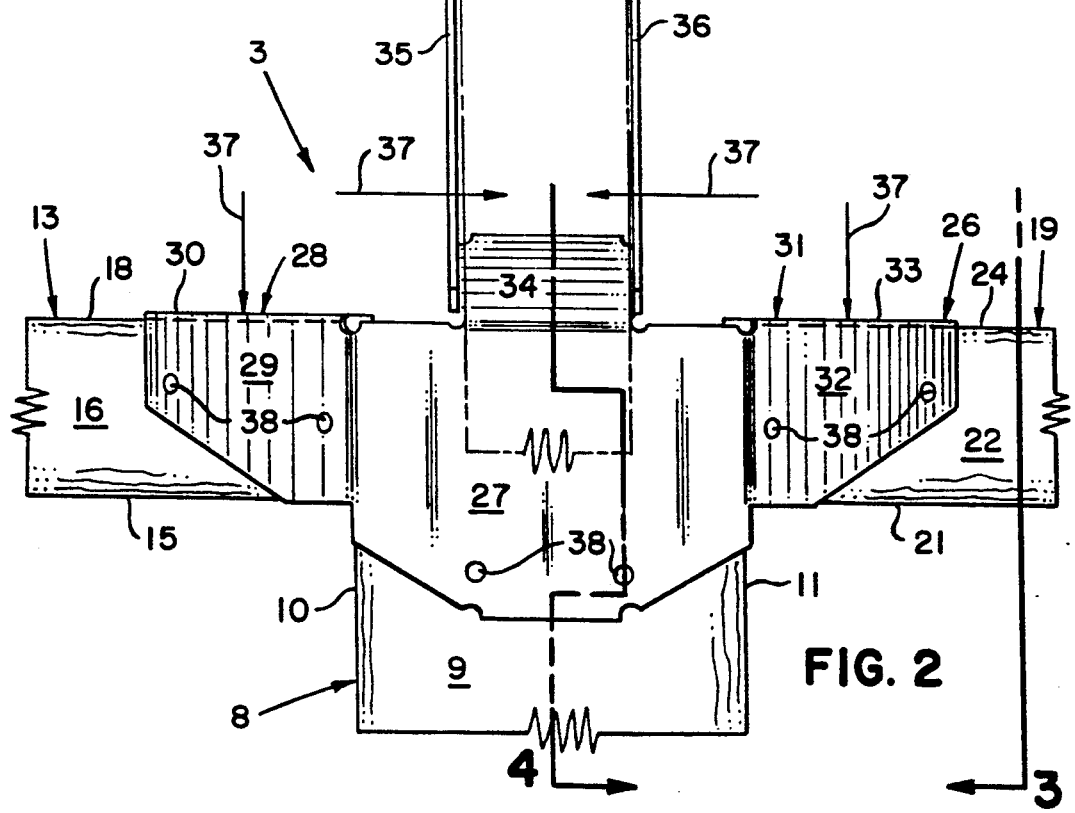
FIG. 2 is a front elevation view of the connection taken along line 2—2 in FIG. 6.
Figure 5:
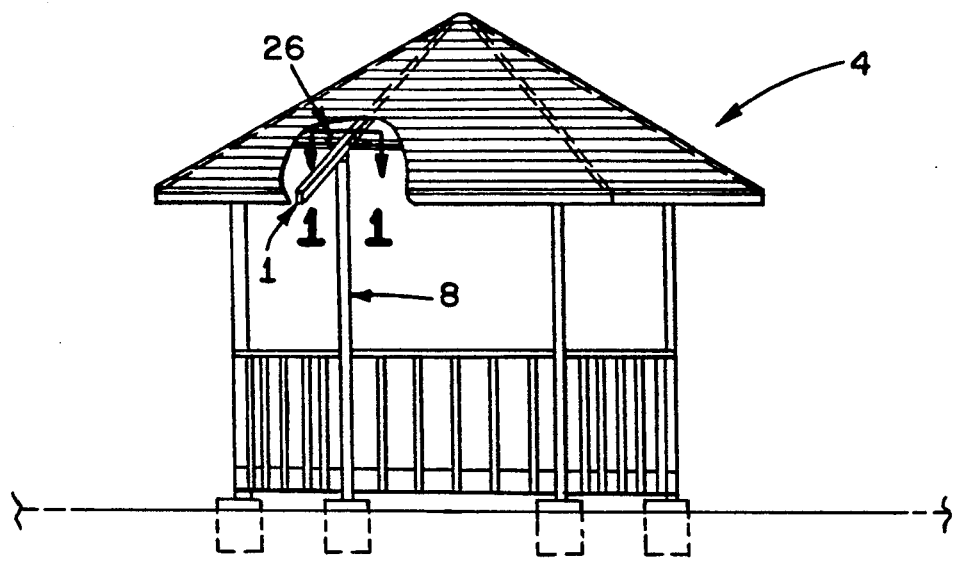
FIG. 5 is a front elevation view of a gazebo with portions of the roof covering removed to illustrate the location of the connection of the present invention.
Figure 6:
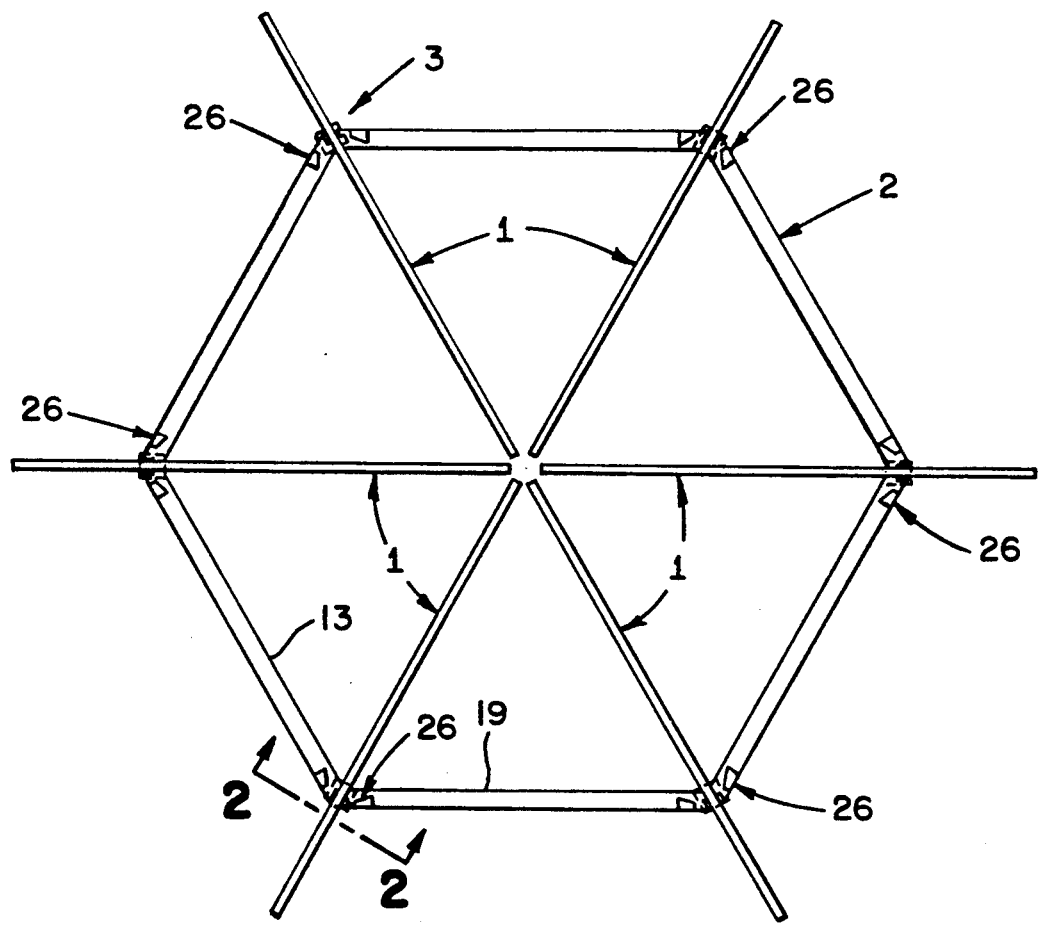
FIG. 6 is a top plan view of a gazebo structure illustrated in FIG. 5 with the roof covering removed.
Figure 7:
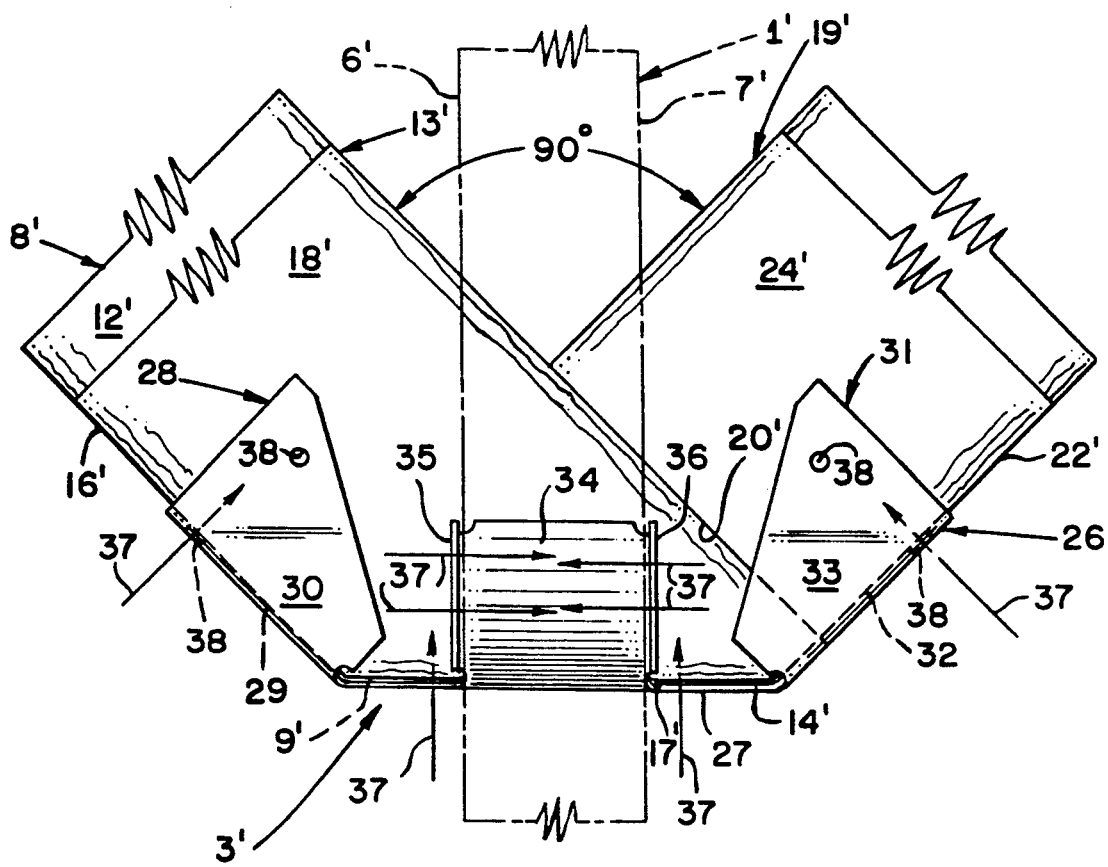
FIG. 7 is a top plan view of an alternate form of connection taken along line 7-7 of a hip roof system building structure. The connector is identical to the connector illustrated in FIGS. 1-6.
Figure 8:
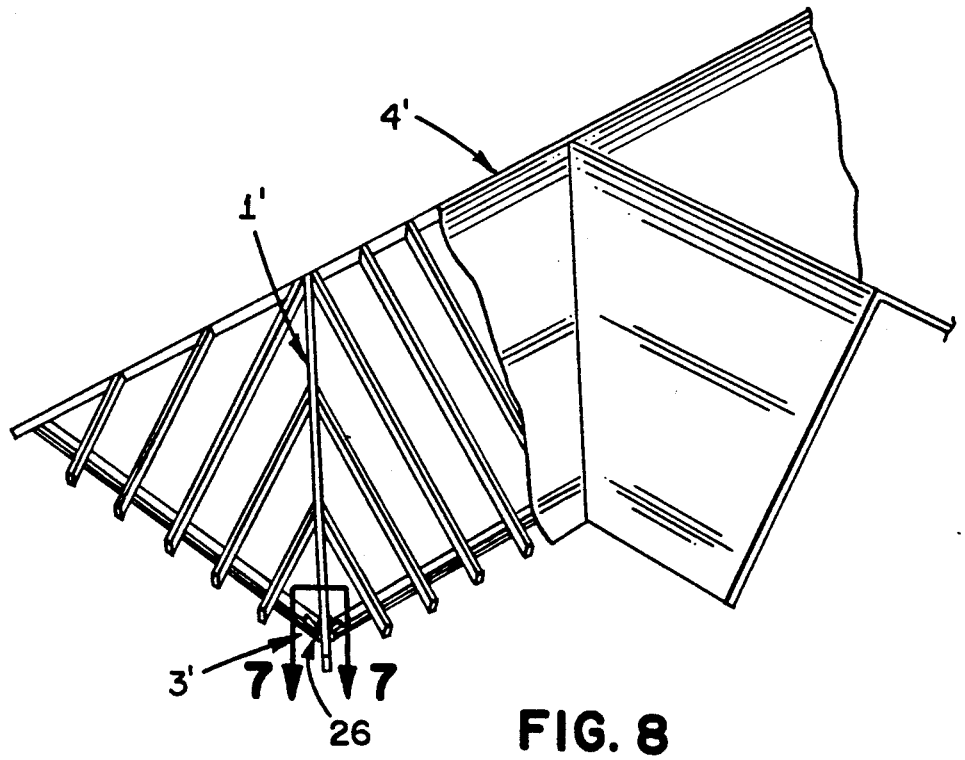
FIG. 8 is a perspective view of a portion of a hip roof with portions of the roof covering removed to illustrate the rafters structure.

The identical connector of the present invention is used in two distinctly different but closely related wood rafter-to-wood building assembly connections; namely, the wood post connection 3 for the gazebo as illustrated in FIGS. 1-6, and the wood corner plate connection 3' illustrated in the hip roof structure 4' illustrated in FIGS. 7 and 8.

Turning first to the wood post connection 3 of the gazebo structure 4 illustrated in FIGS. 1-6, the structure includes: a wood rafter 1 having a bottom edge 5 and generally parallel first and second side faces 6 and 7; a wood post 8 having an outer face 9, opposed first and second side faces 10 and 11, and an end face 12; a wood first top plate member 13 having a first end face 14 and a first lower face 15 in registration with a portion of the end face 12 of the wood post 8 and having a first side edge 16, a first bevel cut 17 in the first side edge 16 and a first top face 18; and a wood second top plate member 19 having a second end face 20 and a second lower face 21 in registration with a portion of the end face 12 of the wood post 8 and having a second side edge 22, a second bevel cut 23 in the second side edge 22 and a second top face 24.

The single element sheet metal connector 26 as it relates to the gazebo structure illustrated in FIGS. 1-6 consists of: a base member 27 dimensioned for registration with the outer face 9 of the wood post 8 and the first and second bevel cuts 17 and 23 in the wood first and second top plate members 13 and 19; a first wing member 28 having a first side flange 29 dimensioned for registration with the first side edge 16 of the wood first top plate member 13 and integrally and bendably connected to the base member and having a first top flange 30 dimensioned for registration with the first top face 18 of the wood first top plate member 13; a second wing member 31 disposed from the first wing member 28 and having a second side flange 32 integrally and bendably connected to the base member 27 and dimensioned for registration with the second side edge 22 of the wood second top plate member 19 and having a second top flange 33 dimensioned for registration with the second top face 24 of the wood second top plate member 19; a seat member 34 integrally and bendably connected to the base member 27 and dimensioned for registration with the bottom edge 5 of the wood rafter 1; a first rafter flange 35 integrally connected to the seat member 34 and dimensioned for registration with the first side face 6 of the wood rafter 1; and a second rafter flange 36 disposed from the first rafter flange 35 and integrally connected to the seat member 34 and dimensioned for registration with the second side face 7 of the wood rafter 1. Fasteners such as screws or nails 37 are used for attaching the base member 27 to the outer face 9 of the wood post 8, for attaching the wing members 28 and 31 to the wood first and second top plate members 13 and 19 and for attaching the first and second rafter flanges 35 and 36 to the wood rafter 1.

Referring to the building structure 4' illustrated in FIGS. 7 and 8, the structure includes: a wood rafter 1' having a bottom edge and generally parallel first and second side faces 6' and 7'; a wood lower corner plate 8' having an outer face 9', and a support surface 12'; a wood first top plate member 13' having a first end face 14' and a first lower face in registration with a portion of the support surface 12' of the wood lower corner plate 8' and having a first side edge 16', a first bevel cut 17' in the first side edge 16' and a first top face 18'; and a wood second top plate member 19' having a second end face 20' and a second lower face in registration with a portion of the support surface 12' of the lower corner plate 8' and having a second side edge 22', and a second top face 24'.

The single element sheet metal connector 26 in wood corner connection 3' is identical to the single element sheet metal connector 26 in wood post connection 3 as illustrated in FIGS. 1-6.

The single element sheet metal connector 26 as it relates to the building structure illustrated in FIGS. 7 and 8 consists of: a base member 27 dimensioned for registration with the outer face 9' of the wood lower corner plate 8' and the first bevel cut 17' in the wood first top plate member 13'; a first wing member 28 having a first side flange 29 dimensioned for registration with the first side edge 16' of the wood first top plate member 13' and integrally and bendably connected to the base member 27 and having a first top flange 30 dimensioned for registration with the first top face 18' of the wood first top plate member 13'; a second wing member 31 disposed from the first wing member 28 and having a second side flange 32 integrally and bendably connected to the base member 27 and dimensioned for registration with the second side edge 22' of the wood second top plate member 19' and having a second top flange 33 dimensioned for registration with the second top face 24' of the wood second top plate member 19'; a seat member 34 integrally and bendably connected to the base member 27 and dimensioned for registration with the bottom edge of the wood rafter 1'; a first rafter flange 35 integrally connected to the seat member 34 and dimensioned for registration with the first side face 6' of the wood rafter 1'; and a second rafter flange 36 disposed from the first rafter flange 35 and integrally connected to the seat member 34 and dimensioned for registration with the second side face 7' of the wood rafter 1'; and fasteners 37 for attaching the base member 27 to the outer face 9' of the wood lower corner plate 8', for attaching the first and second wing members 28 and 31 to the wood first and second top plate members 13' and 19' and for attaching the first and second rafter flanges 35 and 36 to the wood rafter 1'.

Figure 9:
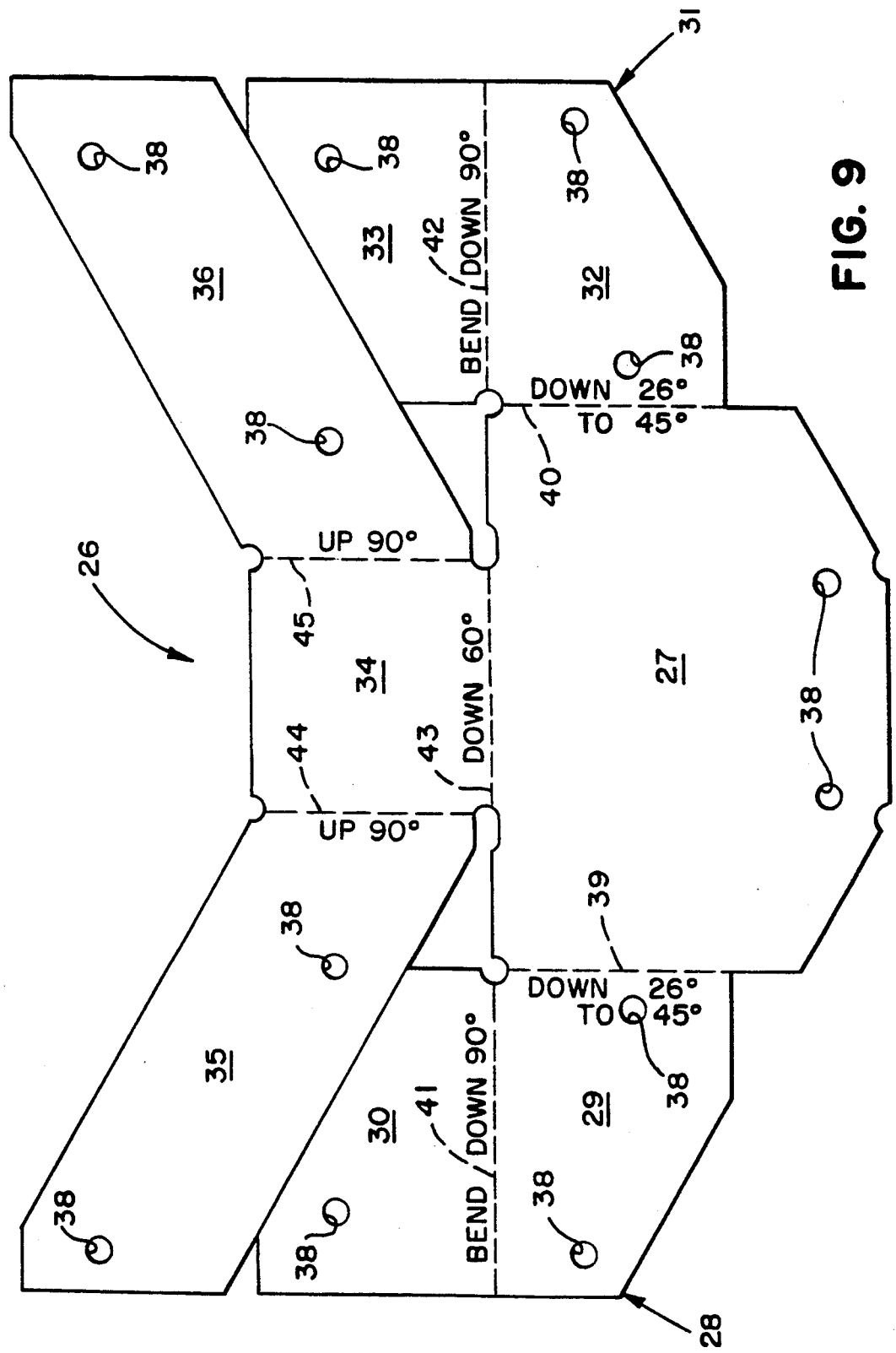
FIG. 9 is a top plan view of the blank used in the construction of the instant connector prior to bending

The instant single element sheet metal connector 26 may be constructed on a progressive die from a coil of 16 gauge galvanized black finish sheet metal having a coil width of 7.5 inches. A typical blank is illustrated in FIG. 9 with the solid lines representing cut lines and the dotted lines representing bend lines. The round solid lines represent suggested fastener openings 38 through which fasteners 37 should be inserted. The fastener openings should be sized for receiving 10d×1" or 10d×1.5" nails.

To form the single element sheet metal connector 26, the blank in FIG. 9 should be bent in the following way, but not necessarily in the following order. First and second wing members 28 and 31 should be bent downwardly along bend lines 39 and 40. To construct the single element sheet metal connector 26 for a gazebo as illustrated in FIGS. 1-6, the first and second wing members 28 and 31 should be bent at any angle between 1° and 45° with a typical angle being 26°. To construct the single element sheet metal connector 26 for a wood corner connection 3' as used in a building structure 4' with a hip roof, the first and second wing members 28 and 31 should be bent downwardly to 45°. Next the first and top flanges 30 and 33 should be bent downwardly 90° along bend lines 41 and 42. Next, seat member 34 should be bent down at any angle between 0° and 90° with a typical angle being 60° along bend line 43. Finally, first and second rafter flanges 35 and 36 should be bent upwardly 90° along bend lines 44 and 45.

Installation of the single element sheet metal connector 26 as illustrated in FIGS. 1-6 in a gazebo structure 4 is as follows. Base member 27 is placed against outer face 9 of wood post 8 with first top flange 30 of first wing member 28 resting on first top face 18 of wood first top plate member 13 and second top flange 33 of second wing member 31 resting on second top face 24 of wood second top plate member 19. Fasteners 37 may be driven through nail openings 38 in base member 27 to hold the single element sheet metal connector 26 in place. Next, first and second wing members 28 and 31 are bent along bend lines 39 and 40 until first and second side flanges 29 and 32 lie flush against first side edge 16 and second side edge 22 of wood first and second top late members 13 and 19. Fasteners 37 now may be driven through fastener openings 38 in first and second side flanges 29 and 32 and in first and second top flanges 30 and 33. Seat member 34 should then be bent at the correct angle along bent line 43 to correspond with the slope of wood rafter 1. Next, wood rafter 1 should be set on seat 34 and when the correct slope of the wood rafter 1 has been determined, fasteners 37 should be driven through nail openings 38 in first and second rafter flanges 35 and 36. As shown in FIG. 6, the same procedure should be followed in installing the other single element sheet metal connectors 26.

Installation of the single element sheet metal connector 26 in the building structure illustrated in FIGS. 7 and 8 is as follows. First, the corner of the wood lower corner plate 8' and the wood first top plate member 13' are bevel cut as illustrated in FIG. 7. The base member 27 is then placed in registration with the bevel cut just made with first top flange 30 resting on first top face 18' and second top flange 33 resting on second top face 24'. Fasteners 37 are then driven into fastener openings 38 into wood lower corner plate 8' and into wood first and second top plate members 13' and 19', and wood lower corner plate 8'. Seat member 34 is then bent to the selected rafter angle along bend line 43, after which wood rafter 1' is placed on seat member 34 and fasteners 37 are driven into wood rafter 1' through fastener openings 38.

As used herein, the term wood building assembly may refer to either the wood post 8 and wood first and second top plates 13 and 19 as illustrated in FIGS. 1-6 for a gazebo structure 4 or wood lower corner plate 8' and wood first and second top plate members 13' and 19' as illustrated in FIGS. 7 and 8 for the building structure 4'.

When the word wood rafter is used herein, it refers to either a 2×4", 2×6" or larger 2" lumber. When used in the building structure 4' illustrated in FIG. 8, wood rafter normally refers to a hip rafter 1'. Although not illustrated, the seat member 34 may have a width to accommodate 4" wide wood members or other common widths.

I claim:

1. A wood rafter to wood building assembly connection in a building structure comprising:
   a. a wood rafter having a bottom edge and generally parallel first and second side faces;
   b. a wood building assembly having an outer face, and a support surface;
   c. a wood first top plate member having a first end face and a first lower face in registration with a portion of said support surface of said wood building assembly and having a first outer side edge, a first bevel cut in said first outer side edge and a first top face;
   d. a wood second top plate member having a second end face and a second lower face in registration with a portion of said support surface of said building assembly and having a second outer side edge, and a second top face;
   e. a single element sheet metal connector having:
      1. a base member dimensioned for registration with said outer face of said wood building assembly and said first bevel cut in said wood first top plate member;
      2. a first wing member having a first side flange dimensioned for registration with said first outer side edge of said wood first top plate member and integrally and bendably connected to said base member for selectable infinitely varying angular relationship and having a first top flange dimensioned for registration with said first top face of said wood first top plate member;
      3. a second wing member disposed from said first wing member and having a second side flange integrally and bendably connected to said base member for selectable infinitely varying angular relationship there between and dimensioned for registration with said second outer side edge of said wood second top plate member and having a second top flange dimensioned for registration with said second top face of said wood second top plate member;
      4. a seat member integrally and bendably connected to said base member for selectable infinitely sloping elevation of said seat member above said first and second top faces of said wood first and second top plate members and dimensioned for seating registration with a portion of said bottom edge of said wood rafter;
      5. a first rafter flange integrally connected to said seat member and dimensioned for registration with said first side face of said wood rafter; and
      6. a second rafter flange disposed from said first rafter flange and integrally connected to said seat member and dimensioned for registration with said second side face of said wood rafter; and
   f. fasteners for attaching said base member to said wood building assembly through said outer face of said building assembly, for attaching said first and second wing members to said wood first and second top plate members through said first and second outer side edges of said first and second top plate members and for attaching said first and second rafter flanges to said wood rafter.

2. A wood rafter to wood top plate and wood post connection in a gazebo structure comprising:
   a. a wood rafter having a bottom edge and generally parallel first and second side faces;
   b. a wood post having an outer face, opposed first and second side faces, and an end face;
   c. a wood first top plate member having a first end face and a first lower face in registration with a portion of said end face of said wood post and having a first outer side edge, a first bevel cut in said first outer side edge and a first top face;
   d. a wood second top plate member having a second end face and a second lower face in registration with a portion of said end face of said wood post and having a second outer side edge, a second bevel cut in said second outer side edge and a second top face;
   e. a single element sheet metal connector having:
      1. a base member dimensioned for registration with said outer face of said wood post and said first and second bevel cuts in said wood first and second top plate members;
      2. a first wing member having a first side flange dimensioned for registration with said first outer side edge of said wood first top plate member and integrally and bendably connected to said base member for selectable infinitely varying angular relationship and having a first top flange dimensioned for registration with said first top face of said wood first top plate member;
      3. a second wing member disposed from said first wing member and having a second side flange integrally and bendably connected to said base member for selectable infinitely varying angular relationship there between and dimensioned for registration with said second outer side edge of said wood second top plate member and having a second top flange dimensioned for registration with said second top face of said wood second top plate member;
      4. a seat member integrally and bendably connected to said base member for selectable infinitely sloping elevation of said seat member above said first and second top faces of said wood first and second top plate members and dimensioned for seating registration with a portion of said bottom edge of said wood rafter;
      5. a first rafter flange integrally connected to said seat member and dimensioned for registration with said first side face of said wood rafter; and
      6. a second rafter flange disposed from said first rafter flange and integrally connected to said seat member and dimensioned for registration with said second side face of said wood rafter; and
   f. fasteners for attaching said base member to said outer face of said wood post, for attaching said first and second wing members to said wood first and second top plate members through said first and second outer side edges of said first and second top plate members and for attaching said first and second rafter flanges to said wood rafter.

3. A wood rafter to wood corner plate connection in a building structure comprising:
   a. a wood rafter having a bottom edge and generally parallel first and second side faces;
   b. a wood lower corner plate having an outer face, and a support surface;
   c. a wood first top plate member having a first end face and a first lower face in registration with a portion of said support surface of said wood lower corner plate and having a first outer side edge, a first bevel cut in said first outer side edge and a first top face;

d. a wood second top plate member having a second end face and a second lower face in registration with a portion of said support surface of said lower corner plate and having a second outer side edge, and a second top face;

e. a single element sheet metal connector having:
   1. a base member dimensioned for registration with said outer face of said wood lower corner plate and said first bevel cut in said wood first top plate member;
   2. a first wing member having a first side flange dimensioned for registration with said first outer side edge of said wood first top plate member and integrally and bendably connected to said base member and having a first top flange dimensioned for registration with said first top face of said wood first top plate member;
   3. a second wing member disposed from said first wing member and having a second side flange integrally and bendably connected to said base member and dimensioned for registration with said second outer side edge of said wood second top plate member and having a second top flange dimensioned for registration with said second top face of said wood second top plate member;
   4. a seat member integrally and bendably connected to said base member for selectable infinitely sloping elevation of said seat member above said first and second top faces of said wood first and second top plate members and dimensioned for seating registration with a portion of said bottom edge of said wood rafter;
   5. a first rafter flange integrally connected to said seat member and dimensioned for registration with said first side face of said wood rafter; and
   6. a second rafter flange disposed from said first rafter flange and integrally connected to said seat member and dimensioned for registration with said second side face of said wood rafter; and f. fasteners for attaching said base member to said outer face of said wood lower corner plate, for attaching said first and second wing members to said wood first and second top plate members through said first and second outer side edges of said first and second top plate members and for attaching said first and second rafter flanges to said wood rafter.

* * * * *